(12) United States Patent
DeOcampo et al.

(10) Patent No.: US 9,091,351 B2
(45) Date of Patent: Jul. 28, 2015

(54) GATE VALVE

(71) Applicant: ZP Interests, LLC, Houston, TX (US)

(72) Inventors: Hernani G DeOcampo, Spring, TX (US); Robert Y Jones, Houston, TX (US); Balazs Horvath, Spring, TX (US); Henry O Tohill, Magnolia, TX (US); Ricky D Knight, Splendora, TX (US); Melvin B Medina, Spring, TX (US)

(73) Assignee: ZP Interests, LLC, Houston, TX (US)

( * ) Notice: Subject to any disclaimer, the term of this patent is extended or adjusted under 35 U.S.C. 154(b) by 68 days.

(21) Appl. No.: 13/762,005

(22) Filed: Feb. 7, 2013

(65) Prior Publication Data

US 2014/0217320 A1   Aug. 7, 2014

(51) Int. Cl.
*F16K 3/02* (2006.01)
*F16K 3/30* (2006.01)
*F16K 37/00* (2006.01)

(52) U.S. Cl.
CPC ............ *F16K 3/0254* (2013.01); *F16K 3/30* (2013.01); *F16K 37/00* (2013.01); *Y10T 137/8225* (2015.04)

(58) Field of Classification Search
CPC .......... F16K 3/0254; F16K 37/00; F16K 3/00
USPC ........... 251/326, 327, 328; 137/556, 269, 271
See application file for complete search history.

(56) References Cited

U.S. PATENT DOCUMENTS

| | | | |
|---|---|---|---|
| 2,146,470 A * | 2/1939 | Grantham et al. ............. | 251/1.3 |
| 3,069,132 A * | 12/1962 | Grove ............................ | 251/329 |
| 3,463,446 A | 8/1969 | Natho | |
| 3,871,616 A | 3/1975 | Taylor | |
| 3,893,652 A | 7/1975 | Natho | |
| 4,220,268 A * | 9/1980 | Fehling .......................... | 222/600 |
| 4,230,299 A * | 10/1980 | Pierce, Jr. ...................... | 251/14 |
| 4,406,303 A * | 9/1983 | Kilmoyer ....................... | 137/554 |
| 4,440,381 A * | 4/1984 | Tipton, Jr. ...................... | 251/214 |
| 4,505,452 A * | 3/1985 | Bragin et al. .................. | 251/326 |
| 4,679,770 A * | 7/1987 | Liberman ....................... | 251/328 |
| 5,415,378 A * | 5/1995 | Craven .......................... | 251/329 |
| 5,878,994 A * | 3/1999 | Crain ............................. | 251/329 |
| 2010/0171056 A1 * | 7/2010 | Hoang ....................... | 251/129.11 |

FOREIGN PATENT DOCUMENTS

| | | |
|---|---|---|
| CN | 202418869 | 9/2012 |
| GB | 955010 | 4/1964 |
| JP | H106786 | 3/1998 |

* cited by examiner

*Primary Examiner* — Craig Schneider
*Assistant Examiner* — Kevin Barss
(74) *Attorney, Agent, or Firm* — David L. Odom

(57) ABSTRACT

A gate valve system for controlling fluid flow having a valve body with a bore through which fluid can flow. The system includes a valve body having a bore to allow fluid to pass through the valve body and further having a cavity defined by substantially parallel innerside walls of the valve body, a gate wherein at least one end of the gate is defined by a radius perimeter. The system also has a bonnet that is removably coupled to a face of the valve body, wherein a portion of an innerside of the bonnet includes a curved surface adapted to mate with the at least one end of the gate defined by the radius perimeter, and an actuation mechanism operationally positioned and removably connected to the gate by way of a thru-hole in the bonnet.

21 Claims, 5 Drawing Sheets

GATE VALVE

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A COMPACT DISK APPENDIX

Not applicable.

BACKGROUND OF THE INVENTION

1. Field of the Invention

This invention relates to fluid control valves, and more particularly, to gate valves designed for use in the oil and gas industry.

2. Description of Related Art

Industrial piping relies upon many types of valves, but by far the most prevalent are gate valves, which are used in applications where it is desired to prevent or allow flow of fluid through piping. Gate valves are particularly useful when minimal flow restriction is desired. Gate valves operate by having a planar member, the gate, which moves in a cavity within the valve. The gate can be translated within the gate valve so that an opening in the gate is in alignment with the flow passageway of the gate valve, an open position in which the gate valve allows fluid to flow through it from one side to the other. However, if the gate is translated to a position so that the opening within the gate is sufficiently out of alignment and unregistered with the flow passageway, a closed position, the flow through the gate is blocked such that fluid does not pass from one side of the gate valve to the other.

One common way of translating the gate within the valve is by manually rotating a hand-wheel. The hand-wheel is typically attached to a threaded area within the gate valve system so that when the wheel turns, it moves a stem attached to the gate and causes the gate to translate linearly within the valve body housing. When the gate reaches one end of its region of motion within the gate valve, it is in the open position; when it reaches the other end, it is in the closed position.

Another way of translating the gate within the valve is through the use of a hydraulic actuation device. With a hydraulic actuation device, hydraulic pressure can be utilized to open and close the gate valve. This is particularly useful where a large amount of force would be needed to open or close the valve, for example, when gates are under relatively high pressure differentials between one side of the valve and the other. Hydraulic and motorized or other electrical actuation devices provide a way to operate the valve where the force required to turn a hand-wheel is too large. These types of actuation devices are desirable where automation is required.

Many times, it is important to provide a way to easily switch between the manually actuation mechanism to a hydraulic, motorized, or other electrical actuation device while retaining the remaining portions of the gate valve. This ability provides tremendous cost savings. For example, a manufacturer is able to fabricate a valve with a manual hand-wheel actuation mechanism and easily switch to a hydraulic actuation mechanism should the market demand for those types of valves increase. Further, being able to switch the actuation means while the gate valve is still in operation allows a user to reduce system downtime.

Often gate valves carry fluids that contain suspended solids. These fine solid particles can clog the gate passageway. In typical gate valves, solid particles in slurries that pass though the valve passageway tend to escape from the flow passageway into the gate cavity where they can concentrate. In the cavities, these solids can pack and in some cases solidify. These solid particles can compress in the ends of the gate passageway such that the amount of particulate matter at the ends prevent the gate from travelling freely in the gate passageway from a completely open to a completely closed position. When this happens, the gate valve may either provide excessive restriction of fluid flow in the open position on be unable to prevent flow in the closed position.

Thus, there is a need in the art for a gate valve system where the actuation means can be replaced without affecting the integrity of the sealed portion of the valve where all the connection to the actuation means are outside of the sealed portions of the gate valve and having a gate and bonnet design that reduces the buildup of particulate matter inside the gate passageway.

SUMMARY OF THE INVENTION

In accordance with the teachings provided herein for controlling fluid flow within a system, one example provides a gate valve system. The system comprises: a valve body having a bore to allow fluid to pass through the valve body and further having a cavity defined by substantially parallel valve body innerside walls; a gate operationally disposed within the cavity, wherein the gate has a passage to allow fluid to pass, wherein at least one end of the gate is defined by a radius perimeter; a bonnet removably coupled to a face of the valve body, wherein a portion of an innerside of the bonnet includes a curved surface adapted to mate with the at least one end of the gate defined by the radius perimeter; and an actuation mechanism operationally positioned and removably connected to the gate by way of a thru-hole in the bonnet, whereby the actuation mechanism effectuates sufficient translational movement of the gate to substantially permit or to substantially impede fluid flow within the system.

In another example, a gate apparatus for use in a fluid control system is provided. The gate apparatus comprises a plate having a passage extending through the plate from a first planar face to a second planar face of the plate, wherein the first planar face and the second planar face are substantially parallel, the plate comprising at least one end defined by a radius perimeter and two substantially parallel opposing side portions, whereby the gate, when translated within the fluid control system between an open and closed position, controls fluid flow within the system.

In yet another example, a gate valve bonnet for use in a fluid control system is provided. The gate valve bonnet comprises a housing having a thru-hole to allow passage of a stem coupled to a gate having at least one end defined by a radius perimeter such that the thru-hole is sealed to limit leakage of fluid inside the fluid control system, the housing further comprising: an innerside portion within the housing, wherein the innerside portion includes a curved surface adapted to mate with the one end of the gate, wherein the gate has at least one end with a substantially congruent mated radius perimeter for fitment with the curved surface; and a substantially planar face that sealably mates with a congruent face on the valve body of a fluid control system to limit leakage of fluid inside the fluid control system.

BRIEF DESCRIPTION OF THE SEVERAL VIEWS OF THE DRAWINGS

The foregoing summary, as well as the following detailed description, will be better understood when read in conjunction with the appended drawings. For the purpose of illustration, there is shown in the drawings certain embodiments of the present disclosure. It should be understood, however, that the invention is not limited to the precise arrangements and instrumentalities shown. The accompanying drawings, which are incorporated in and constitute a part of this specification, illustrate an implementation of systems and apparatuses consistent with the present invention and, together with the description, serve to explain advantages and principles consistent with the invention.

DETAILED DESCRIPTION OF THE INVENTION

Figure 1:
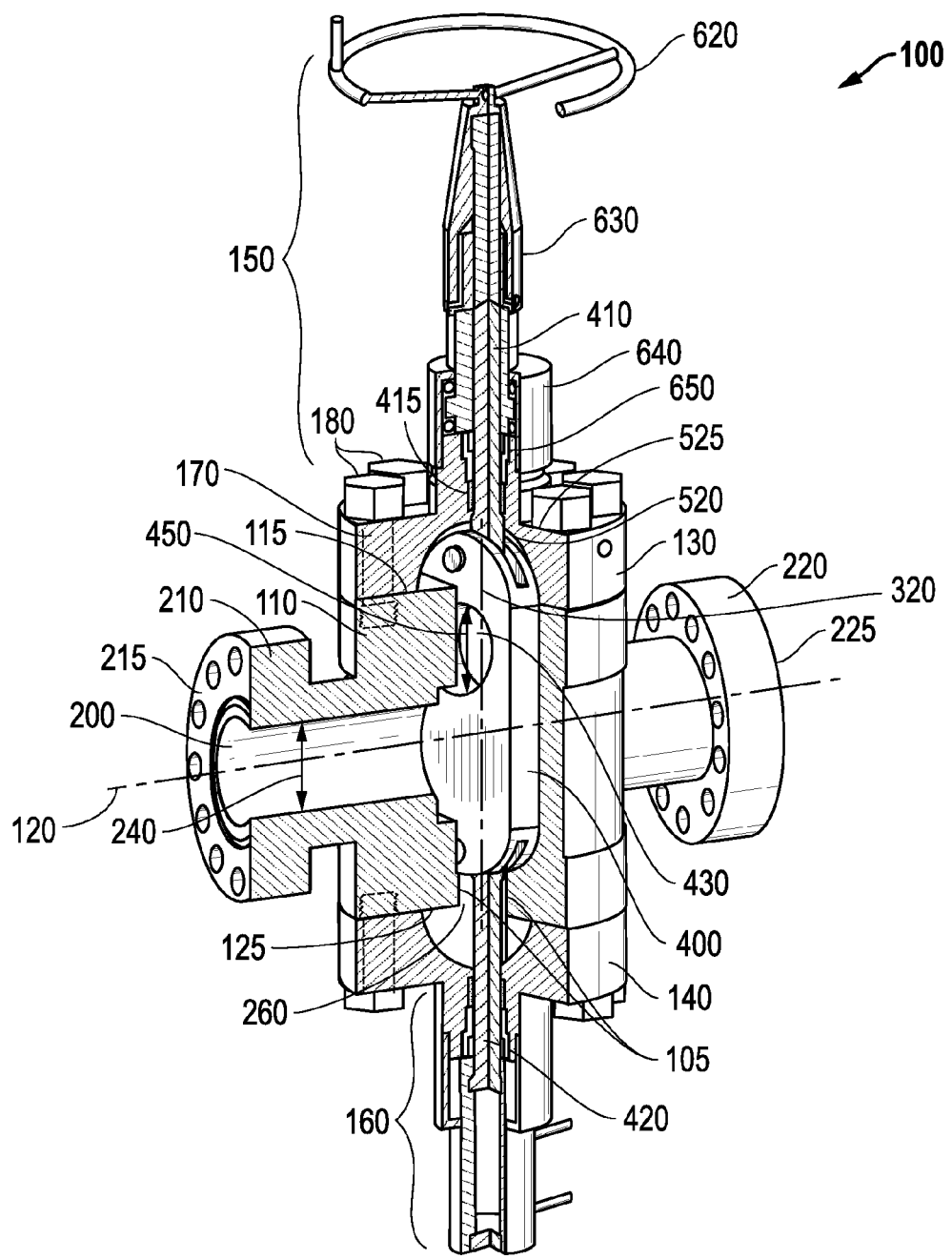
FIG. 1 illustrates a three-dimensional view with a cross-section of a gate valve system according to an embodiment of the invention.

Before explaining at least one embodiment of the invention in detail, it is to be understood that the invention is not limited in its application to the details of construction and to the arrangements of the components set forth in the following description or illustrated in the drawings. The Figures and written description are provided to teach any person skilled in the art to make and use the inventions for which patent protection is sought. The invention is capable of other embodiments and of being practiced and carried out in various ways. Those skilled in the art will appreciate that not all features of a commercial embodiment are shown for the sake of clarity and understanding. Persons of skill in the art will also appreciate that the development of an actual commercial embodiment incorporating aspects of the present inventions will require numerous implementation—specific decisions to achieve the developer's ultimate goal for the commercial embodiment. While these efforts may be complex and time-consuming, these efforts nevertheless would be a routine undertaking for those of skill in the art having the benefit of this disclosure.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity in specific reference to the Figures and are not intended to limit the scope of the invention or the appended claims. Further, it should be understood that any one of the features of the invention may be used separately or in combination with other features. Other systems, methods, features, and advantages of the invention will be or become apparent to one with skill in the art upon examination of the Figures and the detailed description. It is intended that all such additional systems, methods, features, and advantages be included within this description, be within the scope of the present invention, and be protected by the accompanying claims.

Reference will now be made in detail to an implementation consistent with the present invention as illustrated in the accompanying drawings. For the purpose of clarification, embodiments described herein reference the term "fluid," which refers to a gas, liquid, as well as liquid solution with solid aggregates, as well as any material that can reasonably be expected to flow.

Referring to FIG. 1 by way of non-limiting example, and consistent with embodiments of the invention, a gate valve system 100 is shown. The gate valve system 100 includes a valve body 110 having a pair of flanges 210, 220 at opposing ends of the valve body 110. Flanges 210, 220 are designed to accommodate a flange seal (not shown), such as, but not limited to, a metal gasket, on the flange surfaces 215, 225 to enable the gate valve system 100 to connect to other components with flanges. While this embodiment shows a flange type connection, other ways to provide connections are known within the art and can be designed as appropriate for the valve body 110 and related equipment. The valve body 110 also has a top valve face 115 and a bottom valve face 125 to attach additional components, as desired, to form the gate valve system 100. The gate valve system 100 further includes a first bonnet 130, which is removably attached to the top valve face 115 of the valve body 110. The gate valve system 100 also includes a second bonnet 140, which is attached to the bottom valve face 125 of the valve body 110. The gate valve system 100 further includes a mechanical actuation mechanism 150 connected to the first bonnet 130 and retained with a bearing cap 640 and a detection mechanism 160, connected to the second bonnet 140. One of skill in the art will recognize that various commercially available detection mechanisms can be adapted for use with the gate valve system 100.

The valve body 110 contains a body bore 200 having a predetermined body bore diameter 240 through which fluid can travel when the gate valve system 100 is in an open configuration such that there is not substantial restriction to the flow of fluid between flange 210 and flange 220. The body bore 200 is symmetric about a bore center-line 120 that passes through the valve body 110 and through flange 210 and flange 220.

The valve body 110 also contains a gate cavity 260 about a cavity center-line 320. The cavity center-line 320 passes through the center of the valve body 110 and through the top valve face 115 and bottom valve face 125. The gate cavity 260 is symmetric about the cavity center-line 320 and is disposed perpendicular to the body bore 200 thereby permitting a gate 400 to travel within the valve body 110.

Figure 2:
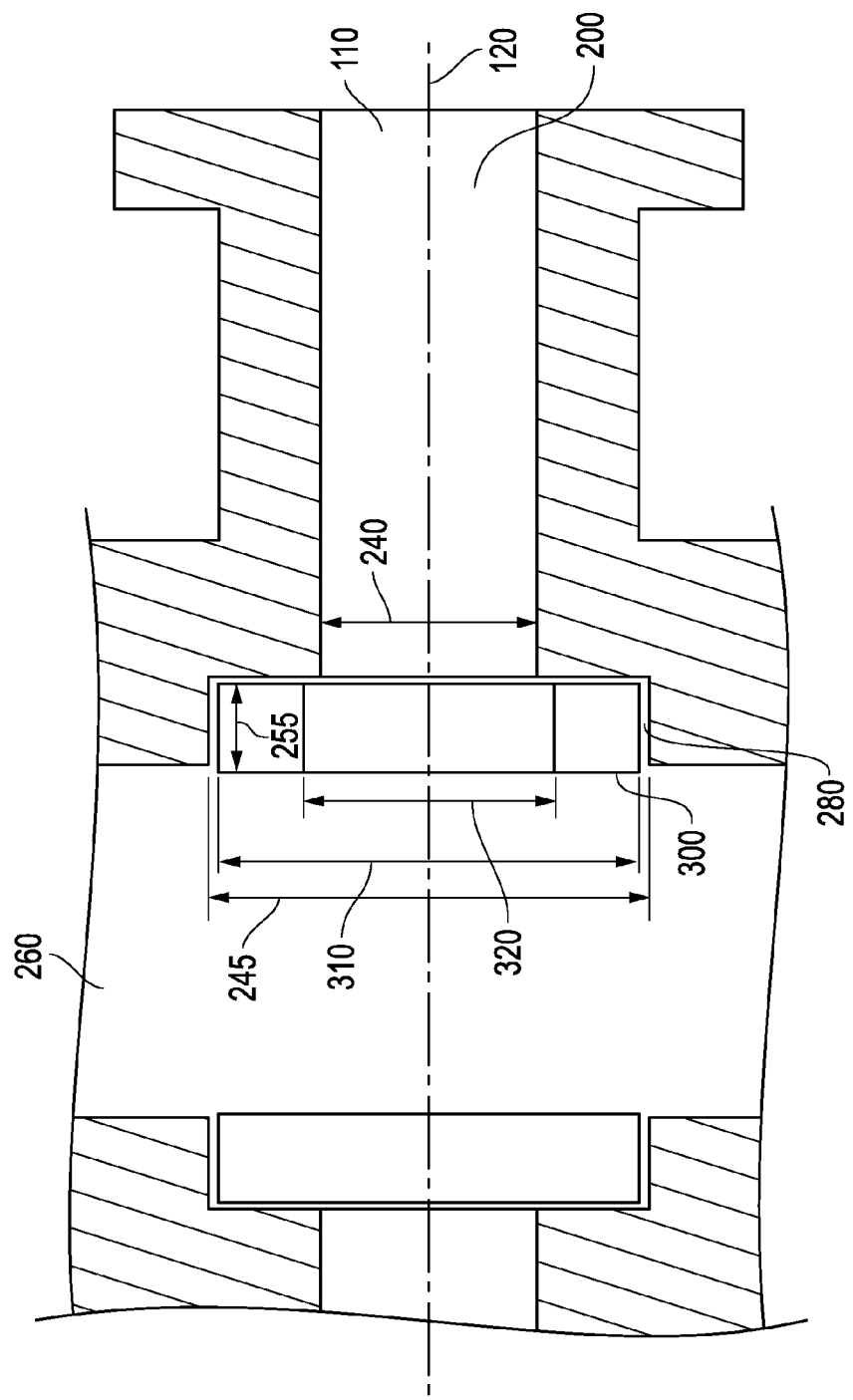
FIG. 2 illustrates a detail of a valve body and a seat according to an embodiment of the invention.

Referring now to FIG. 2, a sectional view of the valve body 110 is shown wherein the valve body 110 further comprises a seat pocket 280 disposed in the body bore 200 having body bore diameter 240 and adjacent to the gate cavity 260. The seat pocket 280 is cylindrical, having a seat pocket diameter 245 and is symmetric about the bore center-line 120. A seat 300 is disposed inside the seat pocket 280. The seat pocket diameter 245 has a dimension that is substantially commensurate with a seat outer diameter 310 so that the seat 300 is disposed and engaged within the seat pocket 280. The seat further has an inner diameter 320 such that the opening in the seat 300 is substantially commensurate with the body bore 200. A seat thickness 255 is chosen so that the gate 400 (shown in FIG. 1) engages with the seat 300 rather than the valve body 110 but wherein the seat 300 is substantially disposed within the seat pocket 280. The dimensions of the seat 300 are determined based on the working pressure and the contact or bearing stress. One of skill in the art will be able to readily adapt such dimensions accordingly One skilled in the art will understand that the valve body 110 and the associated components used to form the gate valve system 100 can be designed about an offset bore center-line 120 and an offset cavity center-line 320. However, for manufacturing and assembly ease, one embodiment of the present disclosure permits for a gate valve system 100 that is substantially symmetrical about the bore center-line 120 and the cavity center-line 320.

Referring now to FIG. 1, showing a cross section of the gate valve system 100, the valve body 110 is designed to be of thickness to meet the required operation specifications, including, but not limited to, API 6A, as well as to provide support to the corresponding structures such as the first and second bonnets 130, 140, respectively, and the gate 400. As a non-limiting example, the first bonnet 130 is attached to the top valve face 115 by way of a fastening device such as, but not limited to bonnet bolts 180. In the present embodiment, the bonnet bolts 180 threadably engage in the top valve face 115 via the first bonnet 130. Other fasteners such as, but not limited to, bonnet bolts traversing thru-holes in both the bonnet 130 and top valve face 115 of the valve body 110 and secured with a nut, can be used as understood by one of skill in the art. In addition, it is typical to provide a seal (not shown) such as a metal gasket between the first bonnet 130 and the top valve face 115 to restrict fluid leakage from the gate valve system 100. Similarly, as described for the first bonnet 130, a second bonnet 140 can be attached to the bottom valve face 125.

In further reference to FIG. 1, what will now be described is how the gate 400 can travel within the gate cavity 260 between an open configuration and a closed configuration. In one embodiment, the gate 400 is designed to positively stop when it substantially reaches an inner face of the first bonnet 130 or an inner face of the second bonnet 140, i.e., when the gate valve system 100 is in the fully open or fully closed configuration. The gate 400 comprises a gate bore 430 offset substantially disposed in an end of the gate 400. A gate bore diameter 450 is preselected such that the gate bore 430 will not impede the free flow of fluid in the gate valve system 100 when the gate 400 is in an open configuration, wherein the gate bore 430 is substantially in alignment with the body bore 200. Typically, the gate bore diameter 450 is designed to be substantially the same as the body bore diameter 240. The gate valve system 100 can also be positioned to a closed configuration when the gate bore 430 is moved into a position relative to the body bore 240 such that the flow of fluid through the gate valve system 100 is substantially reduced or eliminated. This closed configuration is accomplished by causing the gate 400 to move an appropriate amount within the gate cavity 260 in a direction perpendicular to direction of the body bore 200 so that when the gate 400 is in contact with the seat 300 (shown in FIG. 2), it intersects the body bore 110 and substantially reduces or eliminates the flow of fluid between flange 210 and flange 220.

FIG. 1 also shows a first valve stem 410 and a second valve stem 420 attached to the gate 400. The first valve stem 410 is further attached to the mechanical actuation mechanism 150, wherein a hand-wheel 620 can be rotated to cause the first valve stem 410, the gate 400, and the second valve stem 420 to traverse the gate cavity 260 in the valve body 110. The second valve stem 420 is designed to be substantially similar to the first valve stem 410 in structure and function.

The hand-wheel 620 attaches to the first valve stem 410 and rotates within a ball-screw drive assembly 630 to raise and lower the first valve stem 410 and gate 400 within the bonnet 130 and gate cavity 260. The hand-wheel 620 and ball-screw drive assembly 630 are connected to the non-rotating first valve stem 410. The mechanical actuation mechanism 150 is disposed on the bonnet 130 by a bearing cap 640, which engages with a threaded bonnet top 650 to position and retain the mechanical actuation mechanism 150 in the gate valve system 100. The mechanical actuation mechanism 150 can be replaced by a hydraulic drive actuation mechanism, a motor actuation mechanism, or some other means to move the first and second valve stems 410, 420, respectively, and the gate 400 within the gate cavity 260.

In further reference to FIG. 1, the first bonnet 130 further comprises a bonnet hole 170 to accommodate the first valve stem 410. A packing material 415 is disposed between the first valve stem 410 and the bonnet hole 170 to limit leakage of fluid from inside the gate valve system 100. As described for the first valve stem 410 and first bonnet 130, the second valve stem 420 is disposed within the second bonnet 140 and attached to the gate 400 in substantially the same way. In particular, the second bonnet 140 also provides a bonnet hole 170 for the second valve stem 420 in substantially the same way as described for the first valve stem 410. While the first valve stem 410 is enabled to interface with the mechanical actuation mechanism 150, the second valve stem 420 can be used to integrate the detection mechanism 160 within the gate valve system 100 so that the relative position of the gate 400 within the gate cavity 260 can be detected through the relative position of the attached second valve stem 420 within the detection mechanism 160. One of skill in the art will recognize that as an option, if the detection mechanism 160 is not utilized or there is no need for a second valve stem 420, an appropriate second bonnet, i.e., one without a bonnet hole 170 for the second valve stem 420 or one that is different from the first bonnet 130 can be utilized.

Figure 3A:
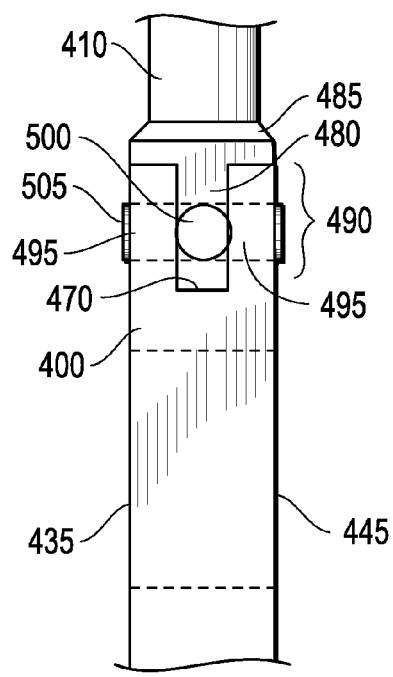
FIG. 3a illustrates a detail of a pin and lug connection of a stem to the gate according to an embodiment of the invention.

Now referring to FIG. 3a, a schematic view of the cross-section of the gate 400 is depicted and details the connection of the first valve stem 410 to the gate 400 having a first gate face 435 and second gate face 445. The first valve stem 410 is attached to the gate 400 through a tongue 480 which is disposed in a stem groove 470 formed in the gate 400. The tongue 480 has a predetermined thickness that is substantially the same as the stem groove 470 but allows the insertion of the tongue 480 within the stem groove 470. The stem groove 470, in conjunction with the gate thru-hole 495, forms a gate lug 490. Stem ribs 485 on the side of the first valve stem 410 are formed to contact the top of the gate 400 to provide support for the first valve stem 410 on top of the gate 400 and locate the tongue 480 within the stem groove 470.

Figure 3B:
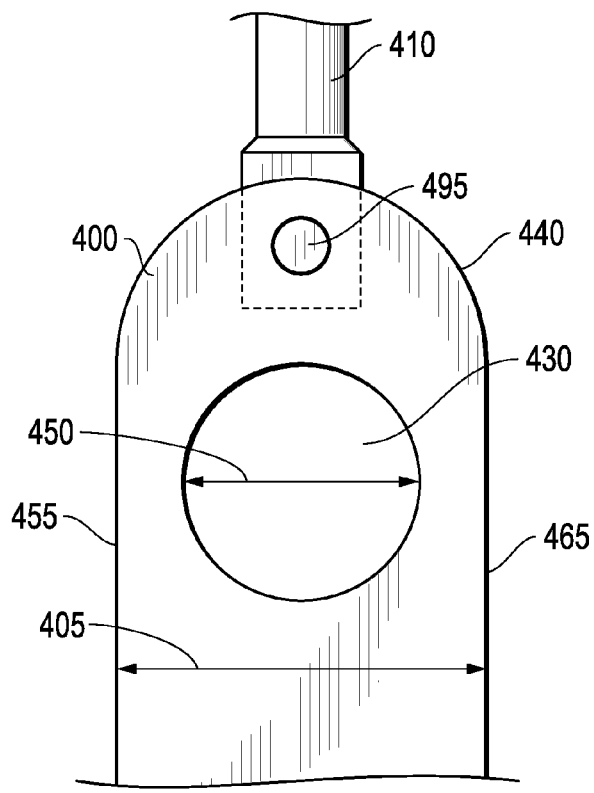
FIG. 3b illustrates a detail of the pin and lug connection of the stem to the gate rotate ninety (90) degrees in relation to FIG. 3a and according to an embodiment of the invention.

Referring to FIG. 3b, depicting the gate 400 with a first gate side 455 and second gate side 465, the stem is designed with a stem thru-hole 500 to align with a corresponding gate thru-hole 495 when the tongue 480 is inserted in the stem groove 470. Upon alignment, a pin 505 is used to affix the first valve stem 410 to the gate 400 by affixing the tongue 480 to the gate lug 490. One end of the pin 505 passes through the lug portion on one side of the gate, through the stem thru-hole 500, and through the lug portion on the opposite side of the gate 400. The pin—505 is long enough to traverse the entire thickness of the gate 400 while at the same time allowing the gate 400 to traverse the gate cavity 260 without interference. A similar pin and lug attachment configuration can be used to attach the second valve stem 420 to the lower portion of the gate 400 with its corresponding stem tongue and groove.

The pin 505 and gate lug 490 mechanism which interface the first valve stem 410 to the gate 400, as described above, is relatively simple to machine and provides several benefits. The pin 505 and gate lug 490 mechanism allows the gate 400 to float freely in the gate cavity 260 which benefits to the sealing integrity of the valve. Further, this design is also mechanically stable because the pin 505 and gate lug 490 assembly is designed with tolerances to keep the parts in shear such that the bending moments are transmitted to a pin.

The gate 400 also comprises a radius perimeter 440 on curved top of the gate 400. In the present embodiment, the radius of curvature of the radius perimeter 440 is directly related to a gate width 405, which is chosen to accommodate the size of the gate bore 430, and is reflected in the gate bore diameter 450. In addition, referring also to FIG. 2, the gate width 405 also accommodates the width of the seat 300, which is the difference between the seat outer diameter 310 and seat inner diameter 320. The seat inner diameter 320 is substantially the same as the gate bore diameter 450. As a result, the gate width 405 is substantially equal to the seat outer diameter 310. As is evident to one with skill in the art, the gate width 405 may be designed larger, for example, if a particularly thin seat 300 is utilized or more gate 400 area is needed to over lap the seat 300. However, the gate 400 does not have a gate width 405 that is substantially smaller than the seat outer diameter 310. This allows the gate 400 to sufficiently contact the seat 300 so that when the gate valve system 100 is in the closed configuration, the seal between the gate 400 and the seat 300 is substantially complete to prevent leakage from one area to another within the valve body 110. Thus, the radius of curvature of the radius perimeter 440 is related to the gate width 405, which in turn is related to the seat outer diameter 310.

Referring now to FIG. 1, the first bonnet 130 has a dome-like structure wherein the radius of curvature of an innerside dome 520 corresponds with the radius perimeter 440 of an end of the gate 400. The bonnet further has a bonnet outer surface 525. By creating the dome-like structure, the first bonnet 130 provides a design with a substantially optimum strength to weight ratio. In effect, a first bonnet 130 of the present embodiment provides such mechanical strength to meet manufacturing specifications while using a minimal amount of material. The disclosed design of the gate 400 and the first bonnet 130 result in these components having a reduced surface area and therefore less material and weight than prior designs. As further shown in FIG. 1, the first bonnet 130 has a periphery that is sufficient in area to provide support for the bonnet bolts 180 on the bonnet outer surface 525 and is sufficient in area to provide support for the seals (not shown) between the valve body 110 and the first bonnet 130.

The gate 400 having a radius perimeter 440 at the top of the gate 400 and the spherical design of the first and second bonnets 130, 140, respectively, reduces the accumulation of debris inside the first and second bonnets 130, 140, respectively. By having the spherical first and second bonnets 130, 140, respectively, debris, e.g., solids within the fluid solution, can easily flow out of the first and second bonnets 130, 140, respectively, because there are minimum jointed interfaces where debris can become entrapped. Further, the spherical design provides a substantially smooth surface wherein debris flows out as fluid flows through the gate valve system 100. Moreover, the radius perimeter 440 of the gate 400 enables the gate to discharge debris towards the edges of the innerside dome 520 as the gate 400 is translated between an open and closed configuration within the gate cavity 260.

Referring now to FIG. 1, and as mentioned above, the gate valve system is designed to be symmetric. In particular, the valve body 110 is symmetrical about the bore center-line 120 and the first bonnet 130 is symmetric about the cavity center-line 320. Further, the gate valve system 100 is also symmetric about the bore center-line 120. As such, the second bonnet 140 is designed in a substantially similar manner to the first bonnet 130, and the first bonnet 130 is interchangeable with the second bonnet 140. Further, the first valve stem 410 is substantially similar to the second valve stem 420, both in its attachment to the gate 400 and its interaction with the first and second bonnets 130, 140, respectively, so that the first valve stem 410 is interchangeable with the second valve stem 420. Moreover, the first and second valve stems 410, 420, respectively, are substantially similar in their attachment to the mechanical actuation mechanism 150 and the detection mechanism 160, respectively, so that they are also interchangeable. Further, because the first bonnet 130 is substantially similar to the second bonnet 140, the mechanical actuation mechanism 150 or the detection mechanism 160 can be attached to either the first bonnet 130 or second bonnet 140.

In another embodiment, two actuation mechanism can be used at the same time in the gate valve system 100. By way of example and without limitation, the mechanical actuation mechanism 150 can be connected to the first bonnet 130, while a hydraulic drive actuation mechanism (as shown and detailed in relation to FIG. 5) can be connected to the second bonnet 140. This configuration is beneficial where a the hydraulic drive actuation mechanism serves as the primary actuation mechanism and the mechanical actuation mechanism serves as an override mechanism. Because of the symmetric nature of the gate valve system 100, actuation mechanisms utilized with embodiments of the gate valve system 100 are interchangeable between the first bonnet 130 and the second bonnet 140. One of skill in the art will recognize that this capability is not limited by the type of actuation mechanism (e.g., mechanical, hydraulic, motorized).

As is evident to one of skill in the art, this symmetrical construction provides manufacturing benefits in tooling and in the inventory of components. By having a symmetrical construction, the number of different components can be reduced and the required tooling to fabricate those components minimized. Further, inventory of components, and therefore the consumption of raw materials, can also be minimized with a symmetrical design because the same part, e.g., the first and second valve stems 410, 420, respectively, or first and second bonnets 130, 140, respectively, can be used for more than one function. That is, the first valve stem 410 is interchangeable with the second valve stem 420. Likewise, the first bonnet 130 is interchangeable with the second bonnet 140. Moreover, because these parts are interchangeable, and because the valve body 110 is symmetric, assembly time is reduced because the likelihood of improper assembly decreases when the valve body 110 does not have a required orientation or preferential connection of the first and second valve stems 410, 420, respectively, and first and second bonnets 130, 140, respectively. One of skill in the art will also understand the added benefit of interchangeability of components during fabrication and servicing, both in the field as well as in the shop.

Figure 4:
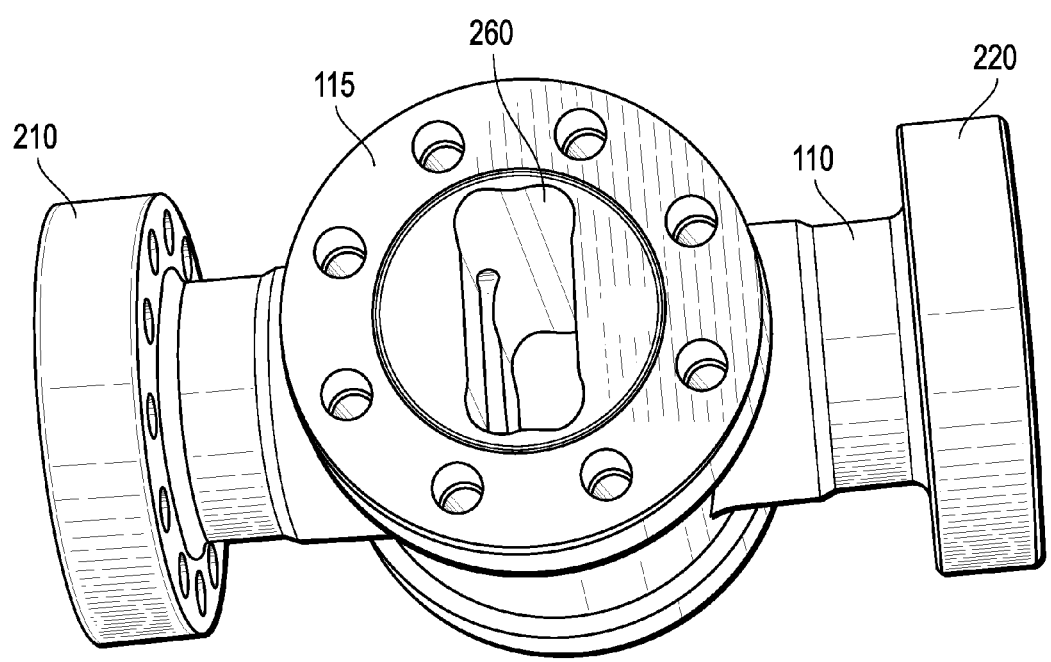
FIG. 4 illustrates a cross-sectional view of a rectangular cavity of a valve body in the gate valve system according to an embodiment of the invention.

Referring now to FIG. 4, the gate cavity 260 in the valve body 110 is shown. The gate cavity 260 is shown to lie between the top valve face 115 and the bottom valve face (not shown). The gate cavity is also shown to be orthogonal to the direction between flanges 210, 220. The gate cavity 260 is machined to be a substantially rectangular channel, which correspond to the dimension of the gate 400, which freely traverses the gate cavity 260. The gate cavity 260 is defined by substantially parallel innerside walls 105 of the valve body 110. Having the dimension of the gate cavity 260 substantially similar to the cross-sectional dimension for the gate 400 allows a thin seat 300 to be utilized. The rectangular gate cavity 260 prevents excessive deflection and distortion of the seat during operation of the gate valve system 100 at full service pressure and temperature. This design also reduces wear on component faces.

Figure 5:
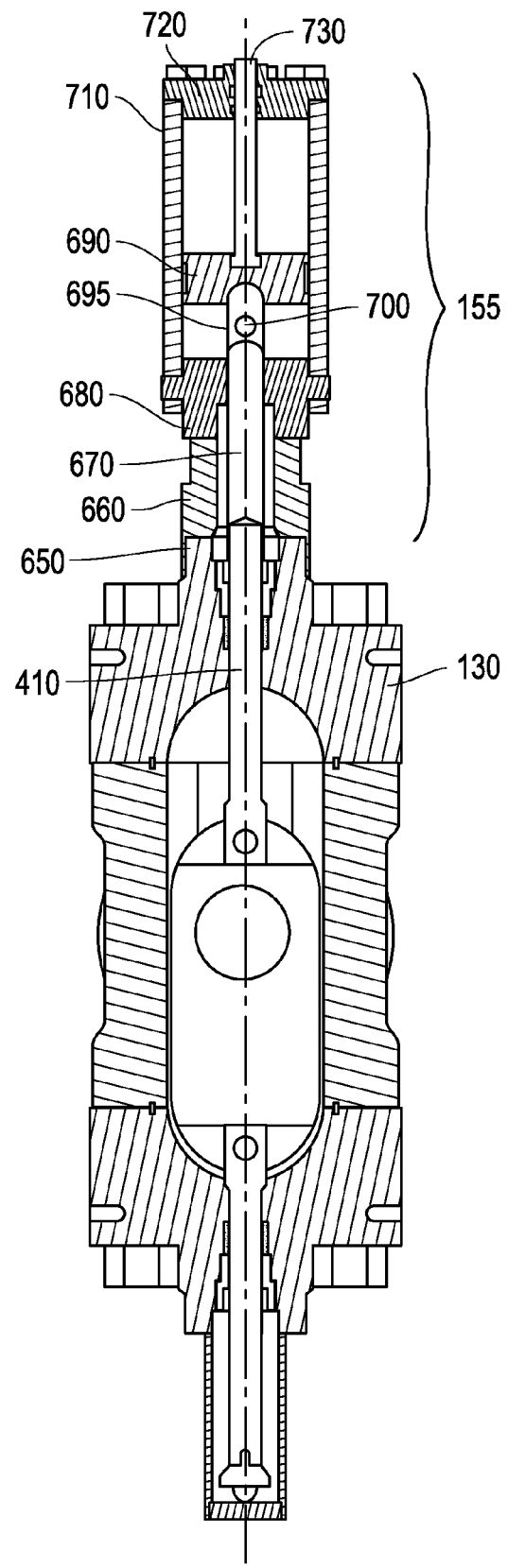
FIG. 5 illustrates a cross sectional view of the gate valve system with a hydraulic actuation mechanism according to an embodiment of the invention.

The mechanical actuation mechanism 150 shown in FIG. 1 is easily interchangeable with other actuation mechanisms. Referring now to FIG. 5, a hydraulic actuation mechanism 155 is engaged with the first bonnet 130 and the first valve stem 410. In many instances, the hydraulic actuation mechanism 155 may not be designed to directly replace the mechanical actuation mechanism 150. In such instances, interfacing components may be required to accomplish the replacement. One of skill in the art will understand that the benefits resulting from the symmetrical design of the gate valve system 100 that was disclosed for the mechanical actuation mechanism 150 applies to the hydraulic actuation mechanism 155 as well as other actuation mechanisms.

Referring still to FIG. 5, a hydraulic actuator adaptor 660 is depicted that interfaces between the bonnet 130 and the hydraulic actuation mechanism 155. The hydraulic actuator adaptor 660 converts the threading between the two components and provides support and spacing for a hydraulic extension stem 670. Because the hydraulic actuation mechanism 155 may be a standard component that is not fabricated to attach directly to the first valve stem 410, the hydraulic extension stem 670 provides an interfacing means to attach the first valve stem 410 with the hydraulic actuation mechanism 155. The hydraulic actuator adaptor 660 attaches to the threaded bonnet top 650 and a lower end connector 680 through which the hydraulic extension stem 670 interfaces with a hydraulic piston 690 in the hydraulic actuation mechanism 155. The hydraulic extension stem 670 is attached to the hydraulic piston 690 through a piston adaptor 695 with an adaptor pin and lug mechanism 700. An actuator cylinder 710 attach to the lower end connector 680 and a top cover 720, with a thru-hole for a rising stem 730, that sits over and is bolted to the actuator cylinder 710. One of skill in the art will understand that the design the interfacing components such as the hydraulic actuator adaptor 660 and the hydraulic extension stem 670 are interrelated and operate together to connect the hydraulic actuation mechanism 155 with the top bonnet 130 as part of the gate valve system 100.

As with the mechanical actuation mechanism 150, the hydraulic actuation mechanism 155 operates to open and close the gate valve system 100 by translating the gate 400 within the gate cavity 260. While the mechanical actuation mechanism 150 utilizes a ball-screw mechanism, the hydraulic actuation mechanism 155 moves the gate through the application of hydraulic pressure to the hydraulic piston 690 whose motion is translated to the gate 400 through the hydraulic extension stem 670 and the first valve stem 410. When hydraulic pressure is applied to the top of the hydraulic piston 690, the gate 400 moves down, into a closed configuration. When hydraulic pressure is applied to the bottom of the hydraulic piston 690, the gate 400 moves up, to an open configuration.

The replacement of the mechanical actuation mechanism 150 with the hydraulic actuation mechanism 155 does not require access to the internal areas of the gate valve system 100. The components that are disassembled and attached do not contact areas where fluid is intended to flow in the valve. Further, the fluid carrying capability and integrity of the gate valve system 100 is not compromised during a conversion. Therefore, this process can be carried out while the gate valve system 100 is in operation. The conversion from a hydraulic actuation mechanism 155 to a mechanical actuation mechanism 150 is substantially reverse of the conversion from a mechanical actuation mechanism 150 to a hydraulic actuation mechanism 155. This conversion involves removal of the actuator cylinder 710, detachment of the hydraulic extension stem 670 from the hydraulic piston 690, removal of the hydraulic actuator adaptor 660, and detachment of the hydraulic extension stem 670 from the first valve stem 410. Following this, the mechanical actuation mechanism 150 directly attached to the first valve stem 410 is attached with the bearing cap 640, as shown in FIG. 1.

The gate valve system 100 is designed to meet industry specifications. For example, in the oil and gas industry the gate valve system 100 may be required to meet API 6A specification, as well as specifications set forth by the National Association of Corrosion Engineers (NACE) and the American Society of Mechanical Engineers (ASME). As evident to one of skill in the art, the materials used to manufacture the gate valve system 100 depend upon the size of the gate valve system 100 and the fluid to be used within the gate valve system 100. The size of the gate valve system 100 and its integral components revolve around the body bore diameter 240. The body bore diameter 240 determines the size of the valve body 110, the gate bore diameter 450, the seat outer diameter 310, the width of the gate 400, the dimensions of the gate cavity 260, the size and curvature of the first and second bonnets 130, 140, respectively, and the dimension of the first and second valve stems 410, 420, respectively. In the oil and gas industry, a body bore diameter 240 of about 4 inches to 7 inches is typical. However, it is not uncommon to have larger body bore diameter 240, for example but not limited to 16 inches.

As noted earlier, the gate bore diameter 450 is substantially similar to the body bore diameter 240 to prevent the gate from restricting flow when the gate valve system 100 is in the open configuration. Also as explained earlier, the dimensions of the gate 400 depend upon the seat outer diameter 310, which is related to the gate bore diameter 450. The first and second valve stems 410, 420, respectively, are capable of moving the gate 400 from the open position to the closed position. The first and second valve stems 410, 420, respectively, also have the mechanical strength to reliably translate the gate 400 in the gate cavity 260. The size of the first and second bonnets 130, 140, respectively, and the curvature of the innerside dome 520 are related to size of the valve body 110. The first and second bonnets 130, 140, respectively, attach to the valve body and accommodate the radius perimeter 440 of the gate 400, which is related to the gate width 405. The first and second bonnets 130, 140, respectively, also accommodate the travel of the first and second valve stems 410, 420, respectively, and the gate 400. Finally, the thickness of material used in the valve body 110 are sufficient to comply with specification, for example pressure requirements. A person of skill in the art will recognize that this invention is not limited to any size of gate valve and reference to dimensions are only provided as exemplary disclosure of a typical gate valve system 100 in the oil and gas industry.

The corrosive properties of the fluid material intended to be used in the gate valve system 100, as well as the pressure rating specified, play a role in determining the materials utilized to form the gate valve system 100. In the oil and gas industry, common corrosive fluids include carbon dioxide, chloride, methane, and hydrogen sulfide. For applications that subject the gate valve system 100 to such fluids, the gate valve system 100 can be fabricated from well-known corrosion resistant materials such as those with a high nickel content. Exemplary and non-limiting materials may include Inconel alloys (e.g., Inconel 625), duplex titanium, or other duplex materials. In a gate valve system 100 with smaller dimensions, the whole gate valve system 100 may be fabricated from a corrosion-resistant material. However, as the gate valve system 100 becomes larger, it may not be economically feasible to fabricate the gate valve system 100 using only these specialized corrosive-resistant materials. In such a case, a standard material, such as AISI 4130, may be utilized as an outer material, which provides support to the valve body 110 and first and second bonnets 130, 140, respectively. To meet corrosion resistance specifications, a nickel-based material may be inlayed inside the body bore 200, the first and second bonnets 130, 140, respectively, the first and second valve stems 410, 420, respectively, gate 400, and seat 300, and other areas in contact with the corrosive fluid. Further, it may be beneficial to use more that one corrosion-resistant material in the gate valve system 100. For example, a material such as PTFE, also known as Teflon, may be utilized for the seat 300. The choice of material is a design and manufacturability decision commonly known and applied by one of skill in the art and does not limit this invention. A person of skill in the art will recognize that this invention is not limited to any particular material and reference to materials are only provided as exemplary disclosure of a typical gate valve system 100 in the oil and gas industry.

It will be appreciated by those skilled in the art that changes could be made to the embodiments described above without departing from the broad inventive concept thereof. It is understood, therefore, that the invention disclosed herein is not limited to the particular embodiments disclosed, but it is intended to cover modifications within the spirit and scope of the present invention as defined by the appended claims.

What is claimed is:

1. A gate valve system comprising:
   a valve body having a bore to allow fluid to pass through the valve body, the valve body further having a cavity defined by substantially parallel valve body innerside walls;
   a gate operationally disposed within the cavity, wherein the gate has a passage to allow fluid to pass, wherein at least one end of the gate is defined by a radius perimeter;
   a bonnet removably coupled to a face of the valve body and comprising a connecting end, wherein a portion of an innerside of the bonnet includes a curved surface adapted to mate with the at least one end of the gate defined by the radius perimeter;
   a first valve stem connected to an upper portion of the gate and a second valve stem connected to a lower portion of the gate; and
   an actuation mechanism operationally positioned and removably connected to the gate by way of a thru-hole in the bonnet, whereby the actuation mechanism effectuates sufficient translational movement of the gate to substantially permit or to substantially impede fluid flow within the system, and the actuation mechanism comprises a ball-screw drive assembly or a hydraulic stem engaged with the first valve stem, and a bearing cap threadedly engaged with the connecting end of the bonnet for removably connecting the actuation mechanism to the connecting end of the bonnet,
   wherein the actuation mechanism is configured to be removed and replaced by an operationally different actuation mechanism by detaching the ball-screw drive assembly or the hydraulic stem from the first valve stem, detaching the bearing cap from the connecting end of the bonnet, and attaching the first valve stem to the operationally different actuation mechanism.

2. The gate valve system as in claim 1, wherein the gate further comprises a substantially parallel first and second face and substantially parallel opposing side portions.

3. The gate valve system as in claim 1, wherein the cavity is a substantially rectangular channel configured to permit translation of the gate.

4. The gate valve system as in claim 1, wherein the valve body is substantially symmetric about a center-line through the bore.

5. The gate valve system as in claim 1, wherein two ends of the gate have a radius perimeter.

6. The gate valve system as in claim 1, wherein the innerside of the bonnet is an arcuate concave dome.

7. The gate valve system as in claim 1, further having a second bonnet removably coupled to a second face of the valve body, wherein a portion of an innerside of the second bonnet includes a curved surface adapted to mate with the at least one end of the gate having the radius perimeter.

8. A gate valve system as in claim 7, wherein the innerside of the second bonnet is an arcuate concave dome.

9. The gate valve system as in claim 7, further having a detection mechanism operationally positioned and removably connected to the gate by way of a thru-hole in the second bonnet, whereby the detection mechanism provides a user indication of the location of the gate within the valve body.

10. The gate valve system as in claim 9, wherein the attachment of the detection mechanism and the actuation mechanism are operationally interchangeable with the bonnet and the second bonnet.

11. The gate valve system as in claim 7, wherein the actuation mechanism is selected from the group consisting of a mechanical actuation mechanism, a hydraulic actuation mechanism, and a motorized actuation mechanism.

12. The gate valve system as in claim 11, further having a second actuation mechanism, wherein the second actuation mechanism is selected from the group consisting of a mechanical actuation mechanism, a hydraulic actuation mechanism, and a motorized actuation mechanism, wherein the second actuation mechanism is operationally positioned and removably connected to the gate by way of a thru-hole in the bonnet, whereby the second actuation mechanism effectuates sufficient translational movement of the gate to substantially permit or to substantially impede fluid flow within the system.

13. The gate valve system as in claim 1, further having a detection mechanism for providing a user indication of the location of the gate within the valve body.

14. The gate valve system of claim 13, wherein the detection mechanism is removable without substantially affecting the sealing capability of the second bonnet.

15. A gate valve system as in claim 1, wherein the actuation mechanism is selected from the group consisting of a mechanical actuation mechanism, a hydraulic actuation mechanism, and a motorized actuation mechanism.

16. The gate valve system as in claim 1, wherein the actuation mechanism is removable without substantially affecting the sealing capability of the bonnet.

17. The gate valve assembly of claim 1, further comprising the operationally different actuation mechanism having a connector, wherein in response to the actuation mechanism being disconnected from the connecting end of the bonnet during operation of the gate valve assembly, the connector of the operationally different actuation mechanism is capable of being attached to the connecting end of the bonnet to replace the actuation mechanism without interrupting the operation of the gate valve assembly.

18. A gate valve bonnet for use in a fluid control system comprising:
   an actuation mechanism comprising a ball-screw drive assembly or a hydraulic stem, and a bearing cap; and
   a housing having a connecting end for threadedly engaging with the bearing cap of the actuation mechanism such that the actuation mechanism is removably connected to the housing, and a thru-hole to allow passage of a valve stem coupled to a gate having at least one end defined by a radius perimeter such that the thru-hole is sealed to limit leakage of fluid inside the fluid control system, the housing further comprising:
      an innerside portion within the housing, wherein the innerside portion includes a curved surface adapted to mate with the one end of the gate, wherein the gate has at least one end with a substantially congruent mated radius perimeter for fitment with the curved surface; and
      a substantially planar face that sealably mates with a congruent face on the valve body of a fluid control system to limit leakage of fluid inside the fluid control system,
   wherein the ball-screw drive assembly or the hydraulic stem is configured to be attached to the valve stem, and the actuation mechanism is configured to be removed and replaced by an operationally different actuation mechanism by detaching the ball-screw drive assembly or the hydraulic stem from the valve stem, detaching the bearing cap from the connecting end of the bonnet, and attaching the valve stem to the operationally different actuation mechanism.

19. The gate valve bonnet as in claim 18, wherein the innerside of the housing includes an arcuate concave dome.

20. A gate valve system comprising:
   a valve body having a bore to allow fluid to pass through the valve body, the valve body further having a cavity defined by substantially parallel valve body innerside walls;
   a gate operationally disposed within the cavity, wherein the gate has a passage to allow fluid to pass, wherein at least one end of the gate is defined by a radius perimeter;
   a bonnet removably coupled to a face of the valve body and comprising a connecting end, wherein a portion of an innerside of the bonnet includes a curved surface adapted to mate with the at least one end of the gate defined by the radius perimeter;
   a first valve stem connected to an upper portion of the gate and a second valve stem connected to a lower portion of the gate; and
   a mechanical actuation mechanism operationally positioned and removably connected to the gate by way of a thru-hole in the bonnet, whereby the mechanical actuation mechanism effectuates sufficient translational movement of the gate to substantially permit or to substantially impede fluid flow within the system, and the mechanical actuation mechanism comprises a ball-screw drive assembly engaged with the first valve stem, and a bearing cap threadedly engaged with the connecting end of the bonnet for removably connecting the mechanical actuation mechanism to the connecting end of the bonnet,
   wherein the mechanical actuation mechanism is configured to be removed and replaced by a hydraulic actuation mechanism by detaching the ball-screw drive assembly from the first valve stem, detaching the bearing cap from the connecting end of the bonnet, and attaching the first valve stem to the hydraulic actuation mechanism.

21. A gate valve system comprising:
   a valve body having a bore to allow fluid to pass through the valve body, the valve body further having a cavity defined by substantially parallel valve body innerside walls;
   a gate operationally disposed within the cavity, wherein the gate has a passage to allow fluid to pass, wherein at least one end of the gate is defined by a radius perimeter;
   a bonnet removably coupled to a face of the valve body and comprising a connecting end, wherein a portion of an innerside of the bonnet includes a curved surface adapted to mate with the at least one end of the gate defined by the radius perimeter;
   a first valve stem connected to an upper portion of the gate and a second valve stem connected to a lower portion of the gate; and
   a hydraulic actuation mechanism operationally positioned and removably connected to the gate by way of a thru-hole in the bonnet, whereby the hydraulic actuation mechanism effectuates sufficient translational movement of the gate to substantially permit or to substantially impede fluid flow within the system, and the hydraulic actuation mechanism comprises a hydraulic stem engaged with the first valve stem, and a bearing cap threadedly engaged with the connecting end of the bonnet for removably connecting the hydraulic actuation mechanism to the connecting end of the bonnet,
   wherein the hydraulic actuation mechanism is configured to be removed and replaced by a mechanical actuation mechanism by detaching the hydraulic stem from the first valve stem, detaching the bearing cap from the connecting end of the bonnet, and attaching the first valve stem to the mechanical actuation mechanism.

* * * * *